S. HAMBLIN.
Link for Valve-Motion.
No. 202,166. Patented April 9, 1878.
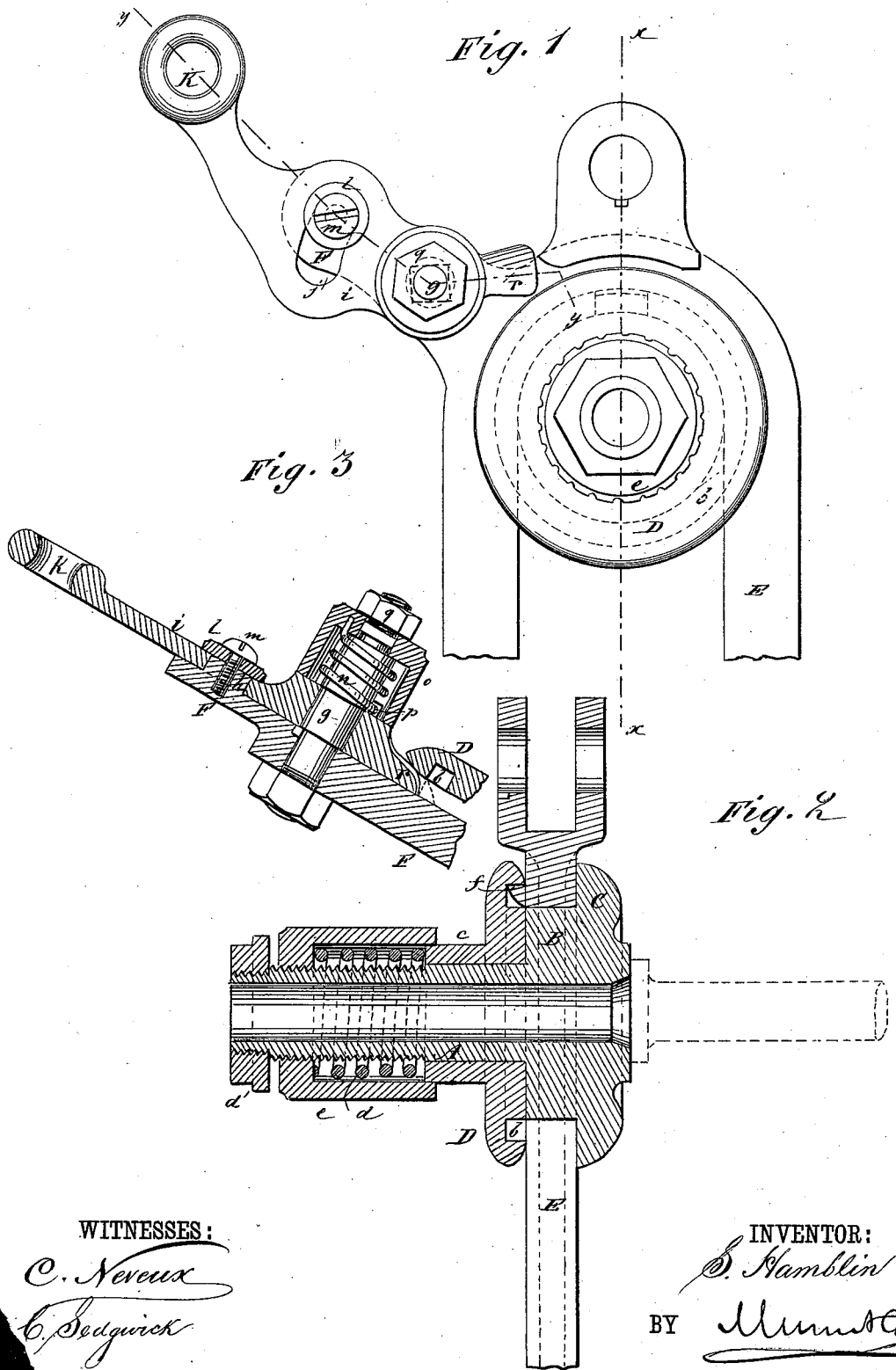
WITNESSES:
C. Neveux
C. Sedgwick
INVENTOR:
S. Hamblin
BY Munn & Co
ATTORNEYS.

UNITED STATES PATENT OFFICE.

SAMUEL HAMBLIN, OF GREENVILLE, PENNSYLVANIA.

IMPROVEMENT IN LINKS FOR VALVE-MOTIONS.

Specification forming part of Letters Patent No. 202,166, dated April 9, 1878; application filed January 28, 1878.

*To all whom it may concern:*

Be it known that I, SAMUEL HAMBLIN, of Greenville, in the county of Mercer and State of Pennsylvania, have invented a new and Improved Link-Motion, of which the following is a specification:

Figure 1 is a side elevation of a portion of a link, showing the application of my improvement. Fig. 2 is a vertical section on line $x\,x$ in Fig. 1. Fig. 3 is a section taken on line $y\,y$ in Fig. 1.

Similar letters of reference indicate corresponding parts.

The object of my invention is to provide a device for adjusting the link of a reversible engine by means of a cord, and also to clamp the link in any desired position, so that the engine may be run with the operating-valve at less than a full stroke.

The invention consists in a novel combination of devices, which will be hereinafter more fully described.

Referring to the drawing, A is a sleeve, which is fitted to the wrist-pin that projects from the rocker-arm that moves the valve. This sleeve is provided with a boss, B, having a flange, C.

A flange, D, which is of the same diameter as the flange C, is fitted to the sleeve A, and in its face which looks toward the flange C is made an annular groove, $b$, having an internal diameter which is the same as the diameter of the boss B of the sleeve A. The flange D is beveled from its periphery toward the groove $b$.

Upon the sleeve A and against the boss $c$ of the flange D a spiral spring, $d$, is placed, which is inclosed by a cap, $e$, which is fitted to the threaded portion of the sleeve and to the boss $c$, and is capable of being screwed against the spring to compress it and cause it to bear with more or less force against the boss of the flange D. A nut, $d'$, is fitted to the extreme end of the sleeve A, which is screwed down on a shoulder formed on the sleeve, and prevents the cap $e$ from escaping from the sleeve.

The cap $e$ is milled or provided with longitudinal ribs to give it a better surface for handling.

On the boss B of the sleeve A, and between the flanges C D, the link E is placed. The link is provided with a nib, $f$, whose upper forms a right angle with the face of the link, while its lower face is beveled. This nib is received by the annular groove in the flange D, and holds the link down on the boss B.

The link is connected with the eccentric-rods in the usual way, and it is provided with an arm, F, from which a stud, $g$, and boss $h$ project from its face at right angles. On the stud $g$ a lever, $i$, is placed, which has an arc-shaped aperture, $j$, for receiving the boss $h$, and has in its outer end an eye, $k$, for receiving the cord by which the link is operated. A washer, $l$, is secured to the boss $h$ by the screw $m$.

A torsional spring, $n$, is placed on the stud $g$, one end of it being received in a hole in the cap $o$, while the other end engages a lug, $p$, that projects from the face of the lever. The outer end of the stud $g$ under the nut $q$ is polygonal in form, and the cap has in it an aperture of corresponding form, so that the nut may be loosened, and the cap $o$ may be disengaged from the stud and turned to give the spring $n$ more or less tension, and be replaced and secured by the nut $q$.

The lever $i$ is provided with a wedge-shaped end, $r$, that is capable of entering between the flange D and the link E and forcing the flange away from the link, so as to disengage the grooved flange from the nib $f$ and permit of the raising of the link by means of the cord connected with the lever $i$. The engine may thus be reversed by a person at a distance, and by releasing the lever the link permitted to fall into its normal position.

If it is desired to work the valve at anything less than a full stroke, the link is clamped in the desired position between the flanges C D by turning the cap $e$ so as to compress the spring $d$ with sufficient force to clamp and hold the link between the flanges.

Having thus described my invention, what I claim as new, and desire to secure by Letters Patent, is—

1. The link-support consisting of the flanged sleeve A, the flange D, the spring $d$, and cap $e$, in combination, substantially as herein shown and described.

2. The grooved spring-actuated flange D, in combination with the link having the nib $f$, substantially as herein shown and described.

3. The combination, with the flange D and link E, of the lever $i$, having a wedge-shaped end, $r$, as and for the purpose described.

4. The combination, with link-block, of the stud $g$, having a polygonal portion, the cap $o$, and spring $n$, in combination with the lever $i$, substantially as and for the purpose herein shown and described.

SAMUEL HAMBLIN.

Witnesses:
H. M. HAMBLIN,
J. C. HAMBLIN.